July 25, 1967  M. O. HANSEN  3,332,720
RETRACTABLE, STOWABLE AND YIELDABLE TO NORMAL FORCE BUT
AUTOMATICALLY RESTRAINING TO NON-NORMAL FORCE
SEAT BELT MECHANISM Filed Feb. 1, 1966  4 Sheets-Sheet 1

INVENTOR.
MELVIN O. HANSEN
BY
ATTORNEY.

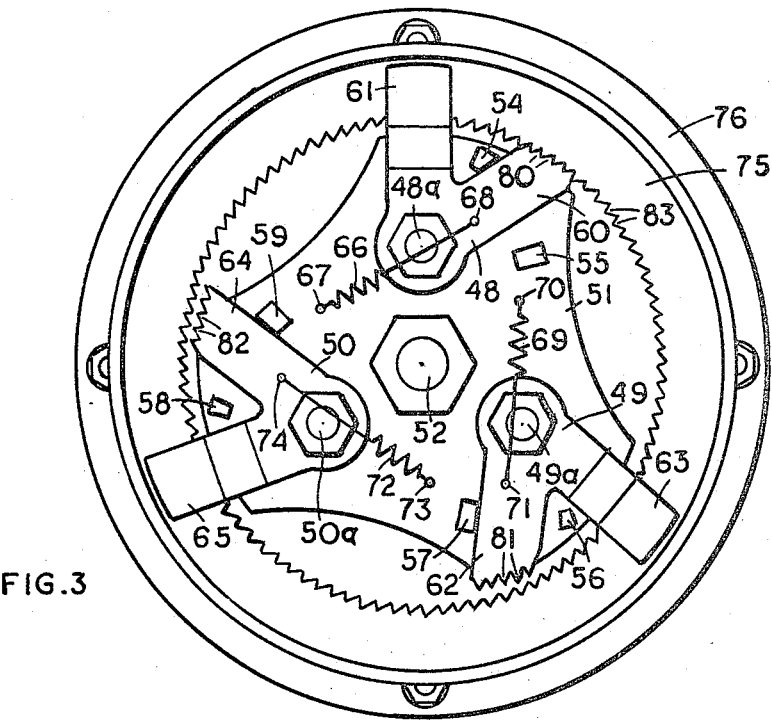

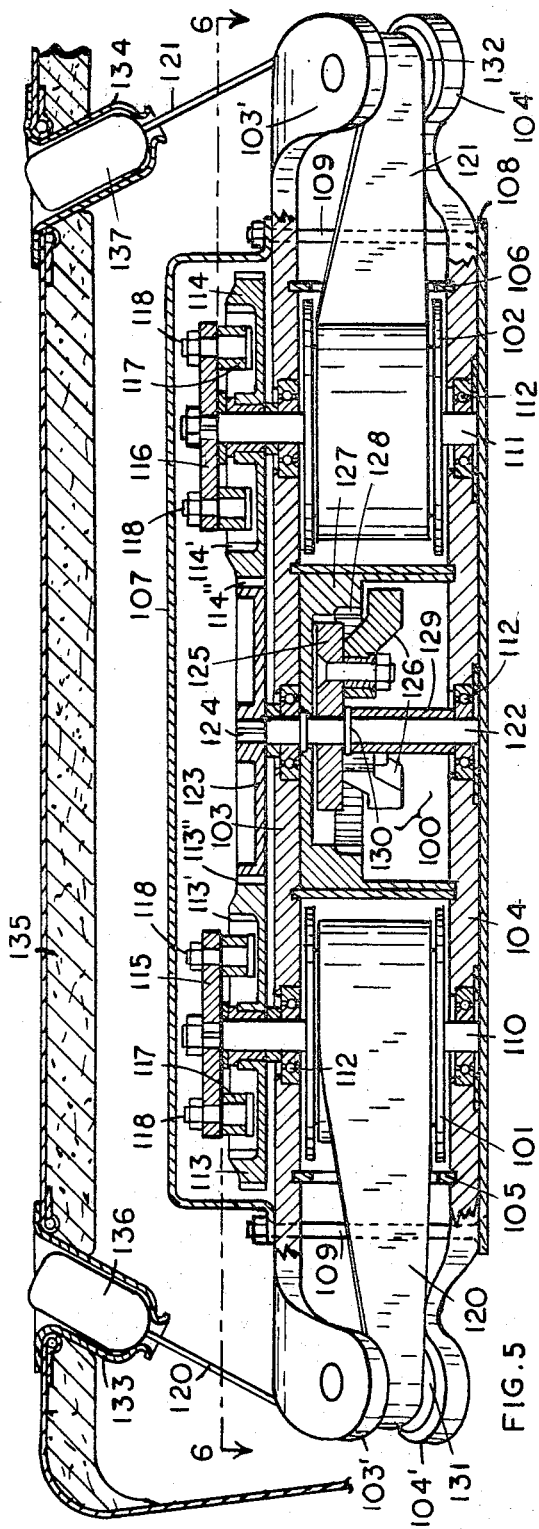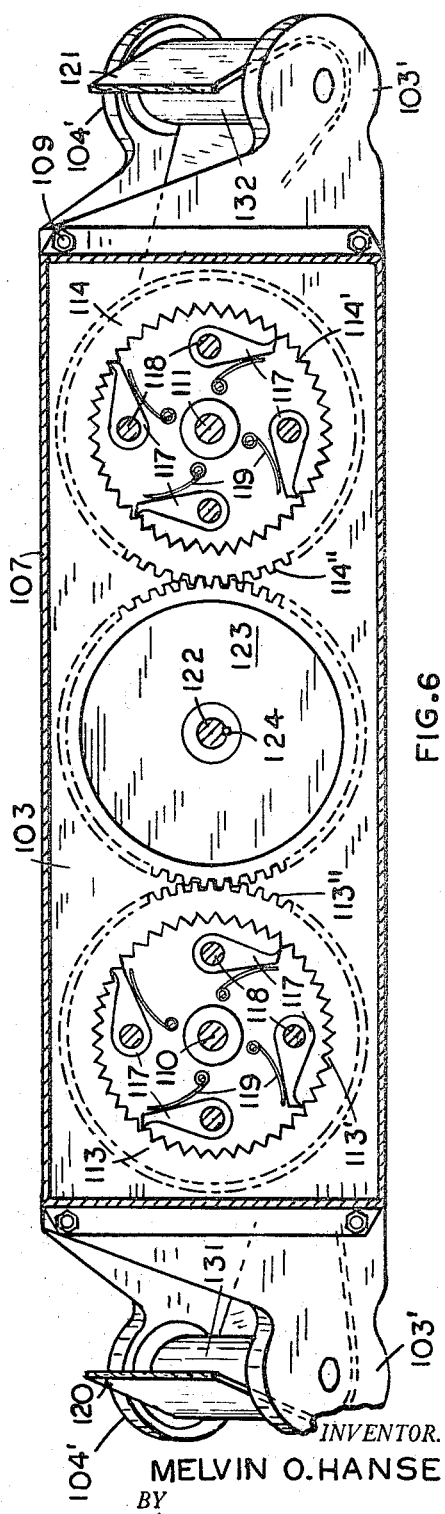
FIG. 5
FIG. 6
INVENTOR.
MELVIN O. HANSEN
BY
*Wright Arnold*
ATTORNEY July 25, 1967 M. O. HANSEN 3,332,720
RETRACTABLE, STOWABLE AND YIELDABLE TO NORMAL FORCE BUT
AUTOMATICALLY RESTRAINING TO NON-NORMAL FORCE
SEAT BELT MECHANISM
Filed Feb. 1, 1966 4 Sheets-Sheet 4

INVENTOR.
MELVIN O. HANSEN
BY
AT TORNEY

United States Patent Office 3,332,720
Patented July 25, 1967

3,332,720
RETRACTABLE, STOWABLE AND YIELDABLE TO NORMAL FORCE BUT AUTOMATICALLY RESTRAINING TO NON-NORMAL FORCE SEAT BELT MECHANISM
Melvin O. Hansen, 20237 6th Ave. S., Seattle, Wash. 98148
Filed Feb. 1, 1966, Ser. No. 524,025
3 Claims. (Cl. 297—388)

My invention relates to a retractable, stowable and yieldable to normal force but automatically restraining to non-normal force seat belt mechanism for air and land vehicles.

More particularly, my invention comprises a locking mechanism having pawls pivotally supported from a pawl carrier and angularly spaced within a locking ring, said pawls each comprising an angularly disposed gear engaging arm and an integrally formed weight arm controlling a seat belt extending through the cushion from the winding drum. The pawls may be two or three in number. If two, then they are 180° apart and if three, then they are 120° apart. With three pawls vehicle impact resulting in either positive or negative forces from any direction will react directly on the weighted section of one or more of the three pawls to cause pawl rotation into jaw engagement with the locking ring. Both the inertia or kinetic energy in the weighted section of the pawls and belt pull out resulting from a corresponding acceleration or deceleration force and applied to the pivots of all three pawls, will tend to cause one or more of the three pawls to pivot into locking engagement. Thus, vehicular impact results in instantaneous locking with relatively no seat belt pay-out for maximum safety. Accordingly, two channels of force compound to lock the mechanism during any emergency. These are:

(1) Vehicular acceleration or deceleration in any direction acting on the weight arm of the pawl.
(2) Accelerated belt pull-out acting on the pawl pivot through pawl carrier rotation.

The lock mechanism is an inertia or kinetic energy-operated pawl drum lock mechanism depending on whether the impart force is positive or negative.

Seat belts ordinarily are untidy looking as they are spread out in the car seat, and are not in order and readily available as the buckles are not stowable in known recessed and fixed locations. As such, the seat belts are objectionable. A seat belt should be characterized by having among its features a neat appearance; a locking mechanism which is positively instantaneous and certain in gripping upon occasion of an impact or subject to undesirable force. The belt should permit the wearer freedom for normal movement about in the seat and a cushioning of the sudden gripping of the belt by the locking mechanism. The locking should occur promptly upon impact before any substantial velocity develops in the jaw arm with respect to the locking ring teeth in order to insure positive locking and the avoidance of slipping or passing of the jaw teeth over the ring teeth. Protection should be provided against engagement of the belt with the abdominal portions of the body. Injury has been known to occur by reason of the belt concentrating the force of impact across the abdomen. My object is to overcome such objections and provide retractable seat belts when not in use so that the buckles are retracted for stowing into receptacles, the location of which is positively known.

A more serious objection is the danger of the slipping of the belt up and over the abdominal portion of the operator's body. The belt, to make it more acceptable, must allow the wearer to move about to normal positions and yet the belt must be in position for instant operation in safely holding the wearer in seating position. This means the locking mechanism must be ready instantly to grip in securing position.

Advantages of passing belts through surface of seat cushions are the following:

(1) Provides a "lap" belt wherein the restraining forces are applied to the lap or upper thigh area which is the strongest region of the human frame.
(2) Virtually eliminates belt restraint being applied to the weaker abdominal region which, in at least one newspaper reported case, resulted in fatal internal injuries.
(3) Results in an attenuating effect in deceleration because with my invention a portion of the kinetic energy of the human body is dissipated downward into the seat cushion. This is explained by noting that as the body in an emergency tends to continue in its forward direction of motion, the loop of the belt moves through an arc, pivoting around the location of the belt rollers located under the seat, and pulls the thighs progressively deeper into the seat cushion. Thus, a considerable portion of the forward directional energy is converted into a vertical component which is absorbed by compression of springs and padding of the seat cushion.

The belt arrangement herein, utilizing the energy absorbing capabilities of the seat cushion, is possible because of the ever present slack take-up feature of the belt retracting springs, and the instantaneous action of the locking mechanism. These features result in automatic belt adjustment and relatively no measurable belt pay-out at impact. The only forward movement of the pelvic region of the body, relative to the vehicle during a forward collision, is in a forward downward arc with a radius described by the distance between the belt loop and the belt rollers which are below the surface of the seat.

This invention is also superior to side mounted belts for individual bucket type seats. In the case of a broadside impact, the belts passing through the surface material of the seat in this system will not allow the person to slide over the side of the seat. Instead, the belts passing through the buckle stowage receptacles will cause the seat surface to deflect sideways, thereby retaining the cushion under the buttocks of the person.

An object of my invention is to permit freedom of movement of the wearer of the safety belt and yet provide a special locking mechanism that will positively insure locking of the belt in case of an emergency and yet have a safety belt that will cushion the sudden gripping of the locking mechanism. This latter is provided by the belt passing up through openings in the seat cushion at an angle which renders available the springiness of the cushion to soften the firm secure gripping of the locking mechanism. All these factors, namely, (a) the positiveness of the sudden secure locking of the locking mechanism instantaneously as a result of a sudden change in the state of vehicular motion, (b) the cushioning action of the seat cushion acting on the walls of the opening accommodating the passing therethrough of the seat belt, and (c) the engagement of the belt over the thighs and femur parts of the legs of the wearer in a nonslipping arrangement so the same will not slip up and engage over the abdominal portions of the wearer of the belt cooperate in providing a superior safety belt system. An accident reported in the daily newspaper resulted in a critical injury attributed to the seat belt slipping and engaging the operator across his stomach. To hold the operator the strongest part to be engaged by the belt is the lap or upper portion of the legs. An important object of my invention is to have the strap or belt positively engage this portion of the body. One of my objects is to render this slipping over the abdominal portions of the body practically impossible with my invention. Primarily it is the combination of all these factors, especially with the special nature of the locking mechanism, that comprises my invention.

The special nature of the locking mechanism here referred to is the following:

The providing of the teeth gripping arm in two members rigid with each other, one being an arm bearing the teeth and a second member comprising a weight arm functioning in cooperation with the tooth arm to positively force it, by its inertia or kinetic energy, depending on whether the vehicle is accelerated or decelerated, to move the tooth arm into tooth gripping relation with the teeth of the locking ring. An additional feature of the two arm arrangement is the preferred angular disposition of the arms. However, the fundamental arrangement of having an integral weight arm is the important feature. The degree of angular disposition of the two arms is important. The weight factor positively insures the locking engagement upon sudden deceleration. The same force which actuates in deceleration also is or constitutes the inertia force so there can be no separation of the two. This fact positively insures the locking mechanism to grip and hold fast the seat belt. Note well, the kinetic energy in the weight operates with the development of the deceleration so the interlocking of the grip arm takes place before the belt drum causes a great velocity of the gripping teeth of the gripping arm.

We have conflicting demands on the one hand, the seat belt locking mechanism must be certain of locking in holding position when an emergency occasion is presented. On the other hand, it is highly important that the wearer of the belt be free to move about normally and that the force imparted to the passenger be cushioned so that the force applied to the passenger be not that of the firm unyielding gripping with which the strap is securely locked by the holding mechanism. I provide both of these requirements. The locking mechanism is rigidly held by the interlocking of the teeth. Some cushioning is provided by the strap engagement with the walls of the seat cushion through which the strap passes. Thus, the user has the positive assurance of the strap being firmly anchored and secured and yet the force directly applied to the user is cushioned against the padding and springs of the cushion body. The user gets not only secure holding but smooth, gentle holding by the belt straps of my invention.

Since they come up out of the cushion, the restraining of the user is by engagement of the belt over the thighs with almost no possibility of engagement with the abdominal portion of the body despite any tendency of the user to slide forward as with ordinary and common design of seat belt installations.

The above mentioned general objects of the invention, together with others inherent in the same, are attained by the mechanism illustrated in the accompanying drawings, throughout which like reference numerals indicate like parts:

FIGURE 3 is a plan view of the locking mechanism having three pawls;

FIGURE 4 is a vertical sectional view, with parts in elevation, of a modified form of my invention showing optional use of a cable drum adapted to receive a cable which has a seat belt attached to it.

FIGURE 5 is a sectional view, with parts in elevation, showing a compact embodiment of my invention comprising two seat belt retracting and storage units connected by gear and ratchet means with each other and with a locking unit and having two seat belts extending outwardly and upwardly therefrom through a seat cushion.

FIGURE 6 is a view partly in plan and partly in section taken substantially on broken line 6—6 of FIGURE 5.

Figure 1:
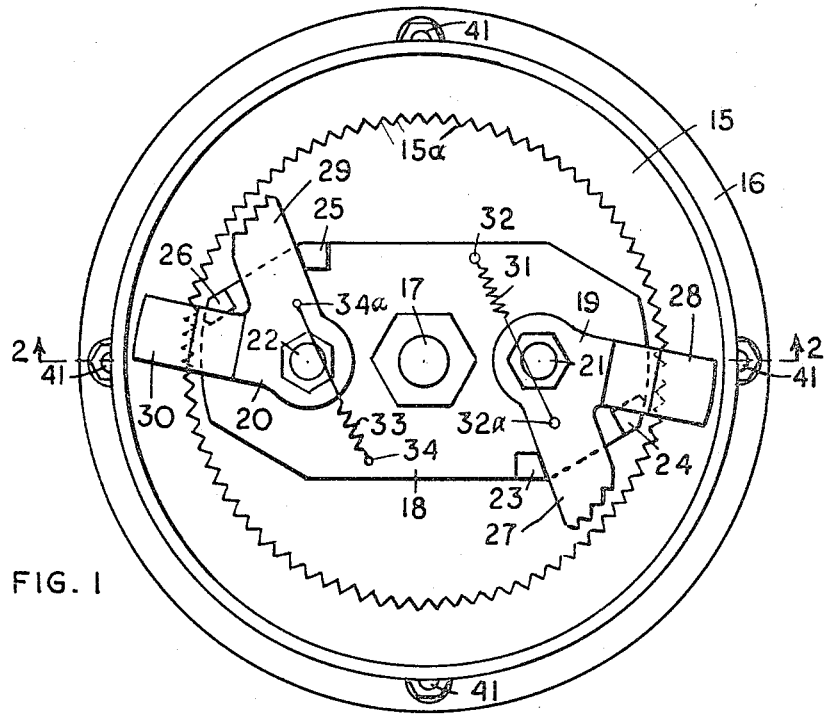
FIGURE 1 is a plan view of the locking mechanism having two pawls.

The locking mechanism comprises (to describe first the two-pawl device, FIGURES 1 and 2) a locking ring 15 rigidly mounted on the housing 16. Also, key mounted on shaft 17 is pawl carrier 18 with pawls 19 and 20 pivotally mounted respectively on pins 21 and 22. Pawl carrier 18 has stops 23 and 24 for pawl 19 and stops 25 and 26 for pawl 20.

Pawl 19 has jaw arm 27 and integrally formed therewith weight arm 28. Pawl 20 has jaw arm 29 and weight arm 30 integrally formed with said jaw arm 29. Jaw arm 27 has a spring 31 nearly axially aligned and secured on pin 32 mounted on carrier 18 and pin 32a mounted on jaw arm 27. Jaw arm 29 has a spring 33 nearly axially aligned and secured to pin 34 mounted on carrier 18 and pin 34a mounted on jaw arm 29. These springs are mounted so that each spring exerts a force slightly to one side of the axis on which the jaw arm is pivoted causing the jaw teeth to be held clear of the teeth 15a of the lock ring 15.

Each jaw arm is formed to extend at a particular angle in advance of its weight arm relative to the direction of carrier rotation for locking. It has been found with this angle approximately 58° the best compromise is obtained between:

(1) The maximum jaw movement with minimum belt payout; and (2) The maximum locking tendency between the jaw and locking ring teeth.

The belt drum 35 may be keyed to shaft 17 by key 36. Shaft 17 may be mounted at its bottom end portion in ball bearing ring 45 in recess 44 in base plate 39 and at its top end in ball bearing 45a in recess 44a of drum housing 43. On shaft 17 is further mounted drum housing 43 secured to base plate 39 by bolts 41 which also secure lock housing 16 on top of drum housing 43. In recess 42 in belt drum 35 is mounted a flat coiled spring 46 secured at one end by screw 47 to shaft 17 and at the other end to pin 47a fixedly mounted in base plate 39.

The disclosure of the locking mechanism of the modified form shown in FIGURE 3, having three pawls, is set forth as follows: The three pawls 48, 49 and 50 having respectively centers of rotation or shafts 48a, 49a and 50a, are mounted on a pawl carrier 51. Said carrier 51 is key-mounted on shaft 52 which forms a pivotal axis. Pawl carrier 51 has stops 54 and 55, 56 and 57, and 58 and 59, i.e., a pair of stops for each pawl. Pawl 48 has jaw arm 60 and weight arm 61. Pawl 49 has jaw arm 62 and weight arm 63 and pawl 50 has jaw arm 64 and weight arm 65. Spring 66 is nearly axially aligned on jaw arm 60 being held by pins 67 and 68 in carrier 51 and jaw arm 60. Spring 69 is nearly axially aligned on jaw arm 62 being held by pin 70 in carrier 51 and pin 71 in jaw arm 62. Spring 72 is nearly axially aligned on jaw arm 64 being held by pin 73 in carrier 51 and pin 74 in jaw arm 64. The pawls 48, 49 and 50 are adapted to engage the locking ring 75 rigidly mounted on housing 76.

My object in having three pawls is to eliminate the remote possibility of having a dead center or null, i.e., balanced application of impact forces.

The design of this locking mechanism is such that there is virtually no tangential motion of the jaw teeth 80 of the pawl 48 relative to the teeth 83 of a locking ring 75 during the locking sequence. The same is true of the teeth 81 and 82 of the pawls 49 and 50 respectively. Since there is no high speed motion of the pawl jaw teeth 80 past the teeth 83 of the locking ring 75 during locking there is no tendency for the pawl teeth 80 to bounce past or slip over the teeth 83 in the locking ring. This can be explained by the fact that acceleration or deceleration force, acting either directly on the pawl pivots or through belt action by fast pull-out, tend initially to move only the pivots 48a, 49a and 50a of the said pawls leaving the jaw teeth of the pawl arm while relatively without motion to be moved into engagement with teeth of the ring. Therefore, as the weighted end of the pawl tends to hold its position, or continue in its path of motion, whichever the case may be, relative displacement of the pivot point of the pawl causes the jaw end of the pawl to move radially into engagement with the locking ring before relative motion or tangential motion is developed therein to any great extent.

Each of the pawls 48, 49 and 50 have pivot centers respectively of shafts 48a, 49a and 50a. Assuming the vehicle is moving forward to the left side of the drawing and it meets with a sudden impact. The kinetic energy of the weight arm 61 would tend to cause the arm 61 to move in a counterclockwise direction. Thus, the pawl jaw would move from unlocked position to stop 55 into teeth engagement, i.e., to stop 54 and cause its jaw arm 60 teeth 80 to mesh with teeth 83 of locking ring 75. Simultaneously, the belt strap 76 will be caused to tend to run out as the passenger tends to continue his motion and is thrown forward in his seat and thus the pivot point 48a will be moved clockwise by the lever equal to the radius from shaft 52 to center 48a of the pawl. This force also will operate to inject jaw arm 60 teeth 80 into mesh or full locking engagement with teeth 83 of locking ring 75. The angular disposition of jaw arm 60 to weight arm 61 produces a prompt locking of jaw arm 60 teeth 80 with teeth 83 of locking ring 75 so there is no chance of a delay of engagement of teeth of jaw arm 60 with teeth of locking ring 75. In constructing the pawl of a weight arm 61 and a jaw arm 60, the jaw arm being formed to extend at a particular angle in advance of the weight arm relative to the direction of carrier rotation for locking, I have found that with this angle at approximately 58° about the best compromise is obtained between:

(1) The maximum jaw movement with the minimum belt payout; and (2) The maximum locking tendency between the jaw and locking ring teeth.

The operation of pawl 49 and pawl 50 is the same as above described for pawl 48. So that in whatever direction in the entire circle of 360° the blow of impact may come, one of the pawls 48, 49 or 50 is located to give maximum locking effect.

Thus in an emergency it is evident that the pawl is subject to two channels of force application, both contributing to instantaneous lock engagement. In a decelerating type of accident the kinetic energy in the weight arm of at least one of three pawls, FIGURE 3, tends to rotate the pawl counterclockwise on its pivot. Simultaneously, the person secured in the belt tends to continue in his direction of motion, thus tending to pull out or accelerate the belt which rotates the carrier 51 and moves the pawl pivot in a clockwise direction. Thus either channel of force will cause lock engagement and considering simultaneous application of both channels, lost motion during the locking sequence is minimal and locking virtually instantaneous.

In an accelerating type of accident, such as a parked or slow moving vehicle being struck from the side or rear by a vehicle traveling at a higher speed, the inertia of the weighted arm of at least one of the three pawls will tend to cause the weight to hold its position. Simultaneously any tendency for the person secured by the belt o pull out or acctelerate the belt will rotate the carrier 51 and move the pawl pivot in a clockwise direction. Thus the pawl weight arm tending to hold its position and the pawl pivot tending to move in a clockwise direction results in lock engagement.

The pawls 48, 49 and 50 must be so disposed as to be retracted from the teeth of the locking ring 75 for normal operation, i.e., in unlocked position but must instantly move outwardly and backwardly into locked position upon an impact. In more detail, as an example, the weight arm 61 during an impact, depending on whether the impact causes acceleration or deceleration, tends to hold or continue in the path of vehicular motion. Assuming the vehicle is in motion and then is suddenly arrested by impact, the pawl weight 61 tends to continue in the same direction of vehicular motion, causes the pawl to overcome the tension of spring 66 and swing the pawl jaw 60 into contact with the locking ring teeth 83. Simultaneously with the above, the person in the belt, also tending to continue in the same direction in which the vehicle had been traveling, accelerates the belt in a payout direction, thereby rotating the drum 35 (FIGURE 2) in a clockwise direction, thus amplifying the force of the weight 61 intending to cause the jaw 60 to move radially and resulting in full tooth engagement. Thus, it can be seen in considering the simultaneous application of the two disinct chtannels of force applied to the pawl 48, first the weight 61 tending to move in a counterclockwise direction due to its kinetic energy and the pawl pivot 48a moving in a clockwise direction from application of the kinetic energy of the person applied to the belt results in a teeth movement of jaw 60 in a radial direction relative to the locking ring teeth rather than tangential. This injection type of tooth engagement virtually eliminates or precludes any tendency of the jaw to move past the ring teeth under high velocity of impact. Hence, the path of tooth engagement is described by the resultant of the opposing motions of the pawl weight (counterclockwise) and the carrier and pawl pivot (clockwise). In addition this results in a minimum belt payout, almost unmeasurable.

In heavy braking and sharp turning a motor vehicle is subjected to forces producing deceleration or acceleration of about .5 g. In my device I preferably use a weight 61 and spring 66 combination which will result in locking at about .5 g when the vehicle acceleration or deceleration is in an optimum direction. Providing a belt drum having a radius with an approximate ratio of two to one over the radius from the carrier shaft 52 to the pawl pivot 48a is highly desirable and makes possible a construction in which a belt pull-out acceleration of about 1 g will be required to produce a pawl pivot acceleration of about .5 g. Preferably the radius of my belt drum is about two inches and the radius of the pawl pivot about one inch and in this construction, if only the belt is accelerated, for instance when the user is pulling the belt out from its stowed position or is intentionally moving around in the seat, the belt acceleration will usually be less than 1 g and the acceleration of the pivot point 48a less than .5 g and nuisance locking will not occur.

Figure 2:
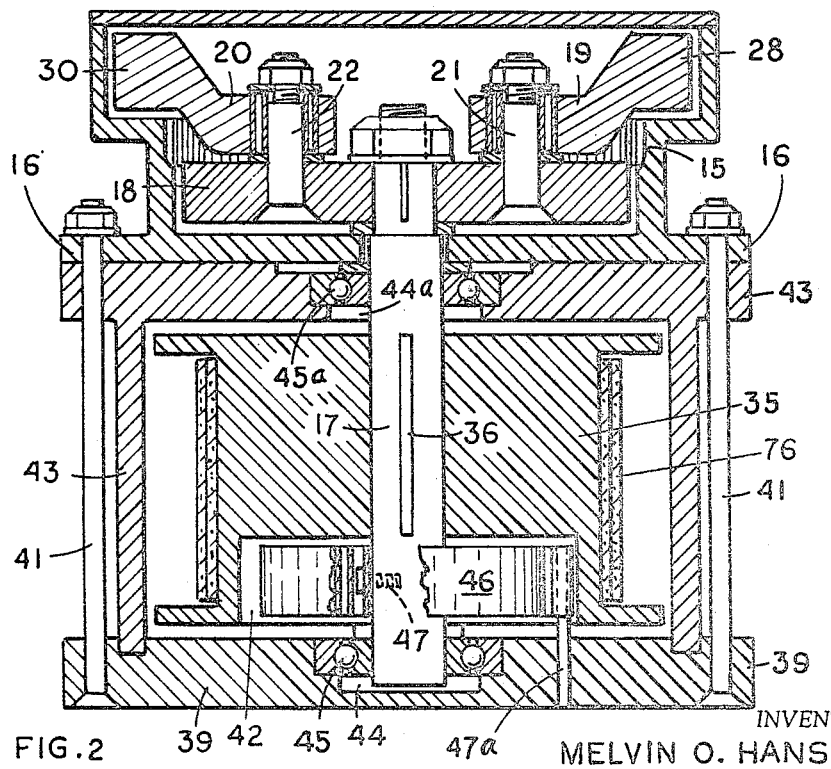
FIGURE 2 is a vertical sectional view on dotted lines 2, 2 of FIG. 1.

The modified form of my invention shown in FIGURE 4 provides a drum and housing construction of minimum height for use in connection with seats where vertical clearance is limited. This construction comprises a cable drum 85 having a spiral peripheral groove 86 adapted to receive a cable 87 which has a seat belt 88 secured to it. A typical installation of cable drum means of this type is diagrammatically shown in FIGURE 7. Drum 85 is keyed to a shaft 89 which is journalled in bearings 90 in two end members 91 and 92. End members 91 and 92 are supported in spaced-apart parallel relation by a housing 93 which can be cylindrical. Bolts 94 clamp parts 91, 92 and 93 together in assembled relation. A spirally-wound spring 95, within a suitable recess 96 in drum 85 has its outer end secured to a post 97 which is rigid with frame member 92 and its inner end secured in any suitable manner to shaft 89 so that said spring 95 will normally retract the cable 87. The upper end plate 91 is adapted to have either the two-pawl locking unit shown in FIGURES 1 and 2, or the three-pawl locking unit shown in FIGURE 3 mounted on it. The lock housing 16 of FIGURES 1 and 2 is also shown in FIGURE 4 for purpose of illustration. The operation of the cable drum shown in FIGURE 4 is the same as the operation of the previously described belt drum means shown in FIGURE 2.

FIGURES 5 and 6 disclose a compact unitized embodiment of my invention in which two belt drums 101 and 102 are mounted between two frame plates 103 and 104 and are controlled by a single locking assembly of the type hereinbefore described, which is indicated generally in FIGURE 5 by numeral 100 and is disposed in an inverted position between the two drums 101 and 102. It will be understood that each drum 101 and 102 is provided with a rewind spring, not shown but which is similar to the spring 46 shown in FIGURE 2.

The frame plates 103 and 104 are supported in spaced-apart relation by two housing members 105 and 106 within which the respective drums 101 and 102 are disposed. A gear and ratchet housing 107 of inverted cup shape rests on the uppermost frame plate 103 and preferably a bottom cover plate 108 is provided under the lowermost frame plate 104. Suitable bolts 109 secure the parts, 103 to 108 inclusive, together in assembled relation.

The belt drums 101 and 102 are respectively secured to upright shafts 110 and 111 which are journaled in bearings 112 in the frame plates 103 and 104. The upper end portions of the shafts 110 and 111 extend a substantial distance above the uppermost frame plate 103 and have combined gear and ratchet wheels 113 and 114 of shallow cup shape rotatively mounted thereon. Wheel 113 has internal ratchet teeth 113' and external gear teeth 113". Wheel 114 has internal ratchet teeth 114' and external gear teeth 114". Two carrier plates 115 and 116 are mounted on and keyed or otherwise fixedly secured to the upper end portions of the respective shafts 110 and 111 so they will be compelled to rotate with said shafts. Each carrier plate 115 and 116 carries a plurality of pawls 117 each positioned adjacent to the under side of its carrier plate and each pawl pivotally supported from its carrier plate by a downwardly extending pivot member 118 which is rigid with the carrier plate. Each pawl 117 is urged outwardly by a spring 119 which is attached to the adjacent carrier plate and yieldingly holds the outer end of the pawl in engagement with the ratchet teeth 113' or 114'. I preferably provide four pawls 117 on each carrier plate 115 and 116 with the pawls on each plate spaced apart and arranged with their tips in staggered relation so that the tip of one pawl 117 on each plate is always in close proximity to the face of a ratchet tooth and ratchet back lash or lost motion between the shafts 110 and 111 and the respective wheels 113 and 114 on said shafts is minimized. This minimizes lost motion between two belts 120 and 121 which are wound on and attached to the respective drums 101 and 102 and the locking device 100. For instance, in a ratchet wheel having forty-five equally spaced teeth the tooth spacing will be eight degrees and, if only one pawl was used on a carrier plate a maximum backlash of approximately eight degrees would be possible. By using four pawls 117 on each carrier plate and staggering these pawls uniformly by one-fourth the angle of tooth spacing the maximum possible angle of lost motion is reduced to not more than two degrees. This is illustrated in FIGURE 6 in which each uppermost pawl 117 is against the face of its ratchet tooth, the remaining pawls of each set, considered in a clockwise direction, are successively spaced two degrees, four degrees, and six degrees beyond the faces of the teeth on which they rest. Thus counterclockwise movement of either pawl carrier will cause the pawls thereof to engage the ratchet teeth at intervals of two degrees.

The inverted locking assembly 100 is preferably of the three-pawl type shown in FIGURE 3 but can be of the type shown in FIGURES 1 and 2. It operates in the same manner as the inertia and kinetic energy type locking units of FIGURES 1, 2 and 3 but its structure is modified in some ways to adapt it to the surrounding mechanism. It comprises an upright shaft 122 journaled in bearings 112 in the frame plates 103 and 104. The upper end portion of the shaft 122 extends above the frame plate 103 and has a gearwheel 123 secured thereon, as by a key 124. The gearwheel 123 is of the same size as, and is positioned between and in mesh with, the two gear and ratchet wheels 113 and 114.

A pawl carrier 125 is keyed or otherwise fixedly secured on shaft 122 and carries combined pawls and weight arms 126, it being understood that the pawl carrier 125 and parts carried thereby are duplicates of the pawl carrier 51 and attached parts shown in FIGURE 3. Said pawl carrier 125, with pawl and weight arm members 126, operates in a housing 127 of inverted cup shape which is rigid with the frame members 103 and 104 and has an annular set of internal ratchet teeth 128 which are duplicates of the teeth 83 shown in FIGURE 3.

Preferably a thrust sleeve 129 is provided on the shaft 122 between a fixed collar 130 on said shaft and the bearing 112 for the lowermost end of said shafts. The outer end portions 103' and 104' of the frame members 103 and 104 are suitably shaped to form bearings for two diagonally positioned guide rollers 131 and 132 over which the respective belts 120 and 121 pass outwardly and upwardly through suitable slots or belt accommodation openings in the lower ends of cup shaped receptacles 133 and 134 which are secured to a seat cushion 135. The upper ends of said belts 120 and 121 are rigidly attached to conventional belt fastener devices 136 and 137 herein termed buckles, which are not shown in detail. When the belts 120 and 121 are not in use the belt fasteners 136 and 137 will be automatically retracted and neatly stowed within the receptacles 133 and 134 where they are readily accessible to a user. The positions of the receptacles 133 and 134 in the seat cushion 135 is such that the belts, when in use will be drawn upwardly alongside of the hips and across the lap of the user below the abdomen and at a location where they will afford maximum security and minimum danger of injury in case of rapid deceleration. In case of severe impact from either side the belts 120 and 121, because they come up through the cushion 135 close to and alongside of the user will prevent him from sliding off of the cushion.

The operation of the two-drum unit shown in FIGURES 5 and 6 is as follows: The two belts 120 and 121 take off from opposite ends of the unit. Said two belts are both wound in the same direction around their respective drums 101 and 102, namely, anti-clockwise as seen in FIGURE 6. Since locking mechanism similar to that of FIGURE 3 is shown inverted in FIGURES 5 and 6 the direction of locking movement of its parts 122, 125 and 126 will be reversed in these figures. This meets the requirements of the construction in which the three enmeshed gears 113, 114 and 123 rotate the locking mechanism parts oppositely from the direction of rotation of the belt drums. When the device is not in use the two belts 120 and 121 will normally be held retracted by the springs in the respective drums 101 and 102. If both belts are pulled out slowly, as for instance when the user is fastening the two belts across his lap or is moving around on the seat in a normal way, the two drums 101 and 102, together with pawl carriers 115 and 116 and pawls 117, will be rotated in the same direction, namely, clockwise as shown in FIGURE 6. This will rotate the medial gearwheel 123 and locking shaft 122 in a counter-clockwise direction opposite from the direction of rotation of the drums without causing the pawls 129 to lock into the teeth 128. Obviously a quick pull on belts 120 and 121 would tend to impart fast rotation in the same directions to all of the just mentioned parts and would instantly cause the pawls 126 to engage with the teeth 128 and lock the belts against withdrawal.

If only one of the belts 120 or 121, for instance the belt 120 shown at the left, is pulled out slowly it will rotate the drum 101 and carrier disc 115 and gearwheel 113 clockwise and the medial gearwheel counterclockwise and the gearwheel 114 clockwise but the ratchet teeth 114' of said gearwheel 114 will ride over the four pawls carried by the carrier 116 without rotating said carrier 116 and the shaft 111 and drum 102 connected therewith. Thus the drum 102 will not be rotated in a direction which would tend to feed the belt 121 out and which might cause said belt 121 to be wadded up within the housing 106 and fail to function properly. In a similar manner the belt 121 can be pulled out slowly without rotating the drum 101 and tending to feed the belt 120 outwardly because ratchet teeth 113' of gearwheel 113 will ride over the four pawls 117 of the carrier 115 without rotating the drum 101.

Figure 7:
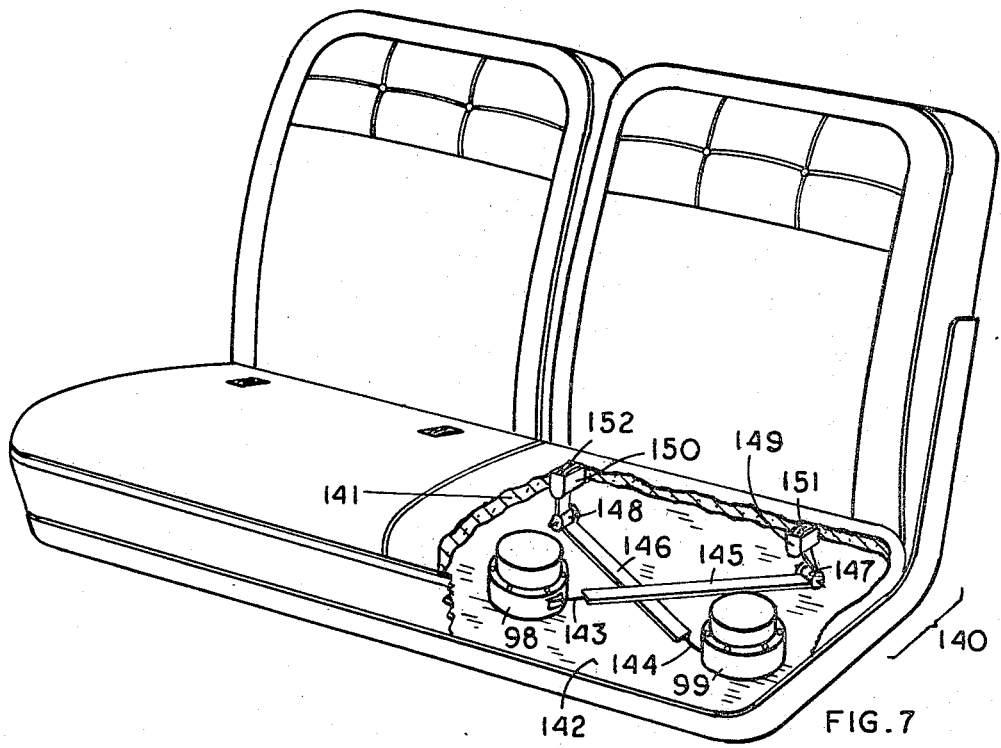
FIGURE 7 is a perspective view, with parts in section, showing an adjustable seat having a cushion and equipped with two cable drum type retracting and storage devices of the form disclosed in FIGURE 4 and further having seat belts which are crossed relative to each other and extend diagonally between the retracting and storage devices and the cushion.

FIGURE 7 shows two locking devices, indicated generally by 98 and 99, which are of the compact cable-drum type similar to the device shown in FIGURE 4. Said FIGURE 7 shows these locking devices installed in a movably adjustable vehicle seat 140 beneath a seat cushion 141. In this installation the two locking devices are positioned near the front of the seat 140 and are secured to a frame member or bottom 142 which is a rigid part of the seat and moves with the seat when said seat is adjusted. Two cables 143 and 144 extend out of the respective locking devices 98 and 99 and two belts 145 and 146 are connected with the respective cables 143 and 144 and extend rearwardly and diagonally across each other to provide the needed length for seat belt use. Said belts are guided around suitably positioned guide rollers 147 and 148 which are supported from seat bottom 142. Said belts 145 and 146 pass upwardly into receptacles 149 and 150 respectively in seat cushion 141 and have belt fasteners 151 and 152 secured thereto, said receptacles being similar to receptacles 134 and 133 of FIGURE 6.

Figure 8:
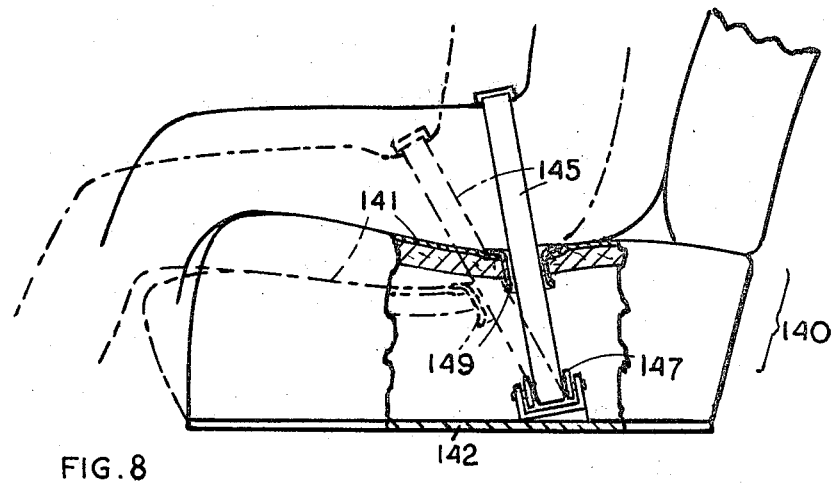
FIGURE 8 is a somewhat diagrammatic view partly in elevation and partly in section, illustrating the cooperation between a resilient seat cushion and my seat belt means in cushioning abrupt forward deceleration of a person using the seat belt means.

FIGURE 8 illustrates the cooperation between a resilient seat cushion and seat belt means constructed and installed in accordance with my invention in resisting and cushioning rapid deceleration of forward movement which tends to cause the user of the seat belt means to slide forwardly on the cushion. For purpose of this illustration it is assumed that the cushion 141, receptacle 149, belt 145 and guide roller 147 are those shown in FIGURE 7 but it will be understood that the mode of operation illustrated in FIGURE 8 is common to all embodiments of my invention. Because the belt 145 and a similar belt on the opposite side of the user come up through the cushion alongside of the user they are normally drawn across his lap rather than across his abdomen. If the user is sitting in a normal position, as shown by full lines in FIGURE 8 and forward movement of the vehicle is abruptly checked, as by a front end collision, he will tend to slide forwardly on the cushion 141 into a position such as shown by dot and dash lines and the seat belts, one of which is belt 145, being locked against pay-out will draw the user down into the cushion 141 and compress the cushion. Thus kinetic energy produced by the forward movement of the user will be partly expended against the resiliency of the cushion and the possibility of injury and discomfort to the user will be reduced. The belts in all forms of my invention allow the user freedom of movement on the seat. When a user moves around or raises himself up off of the seat both belts will pay-out, as required, without any drag of the belts across the user's clothing. Also these belts themselves can be moved lengthwise without releasing the buckles, with one drum paying out and the other drum winding in the belt, to allow the buckles to be repositioned on the user's lap and avoid discomfort caused by the weight of the buckles remaining too long in one position.

Obviously changes may be made in the forms, dimensions and arrangement of the parts of my invention without departing from the principle thereof, the above setting forth only preferred forms of embodiment.

I claim:

1. A vehicle seat having a seat cushion, two belt-retract drums and lock mechanism therefor structurally mounted under the seat cushion; two belts each having a buckle connecting means on one end thereof; two transversely spaced apart receptacles in said seat cushion in which to store the buckles on the belts, each receptacle having in the bottom portion a slot to pass the belt but not the buckle connecting means, the latter being retained in the receptacle; and structural rollers mounted below the receptacles, said belts being wound on the respective retract drums and being guided by the rollers and passing upwardly through the receptacles and seat cushion in suitable positions to be drawn across the upper leg and thigh region but not the abdominal region of a user, the portions of the belts between the guide rollers and the receptacles being normally generally upright, whereby the shock of rapid forward deceleration will be substantially reduced by the pivotal action of the belts in drawing the user downwardly against the resilient cushion.

2. A vehicle seat having a seat cushion, two belt-retract drums and lock mechanism therefor structurally mounted under the seat cushion with the drums disposed on each side of said seat; two belts each having a buckle connecting means on one end thereof; two transversely spaced apart receptacles in said seat cushion in which to store the buckles on the belts, each receptacle having in the bottom portion a slot to pass the belt but not the buckle connecting means, the latter being retained in the receptacle; and structural rollers mounted below the receptacles, said belts being wound on the respective retract drums and being crossed underneath the seat and being guided by the rollers and passing upwardly through the receptacles and seat cushion in suitable positions to be drawn across the lap of a user, whereby in case of a vehicle impact it will be practically impossible for the belt to slip upwardly over the abdomen region but instead the restraint will apply only to the upper leg and thigh region and result in attenuation of the kinetic energy of the body of the occupant by providing an angular change of the belts to their securing means by compression of the seat cushion.

3. A vehicle seat having a seat cushion, two belt-retract drums and lock mechanism therefor structurally mounted under the seat cushion; two belts each having a buckle connecting means on one end thereof; two transversely spaced apart receptacles in said seat cushion in which to store the buckles on the belts, each receptacle having in the bottom portion a slot to pass the belt but not the buckle connecting means, the latter being retained in the receptacle; and structural rollers mounted below the receptacles; said belts being wound on the respective retract drums and being guided by the rollers and passing upwardly through the receptacles and seat cushion in suitable positions to be drawn across the upper leg and thigh region, whereby in case of a side impact the belts passing through the buckle receptacles in the seat cushion will deflect the seat cushion sidewise with the occupant and thereby retain the cushion under the occupant.

(References on following page)

References Cited

UNITED STATES PATENTS

| | | | |
|---|---|---|---|
| 1,908,905 | 5/1933 | Landahl | 188—82.77 |
| 2,341,753 | 2/1944 | Zwald | 188—82.77 |
| 2,708,966 | 5/1955 | Davis | 297—388 X |
| 2,964,100 | 12/1960 | McCall | 297—388 |
| 3,116,092 | 12/1963 | Spranger | 297—388 |
| 3,206,137 | 9/1965 | Snydermann | 242—107.4 |
| 3,222,109 | 12/1965 | Seward | 297—385 |
| 3,248,069 | 4/1966 | Nichols | 242—107.4 |
| 3,248,148 | 4/1966 | Board et al. | 297—388 |

CASMIR A. NUNBERG, *Primary Examiner.*